(12) United States Patent
Watanabe et al.

(10) Patent No.: US 8,939,027 B2
(45) Date of Patent: Jan. 27, 2015

(54) ACCELERATION SENSOR

(75) Inventors: Jun Watanabe, Matsumoto (JP);
Kazuyuki Nakasendo, Shiojiri (JP);
Takahiro Kameta, Okaya (JP)

(73) Assignee: Seiko Epson Corporation (JP)

( * ) Notice: Subject to any disclaimer, the term of this patent is extended or adjusted under 35 U.S.C. 154(b) by 285 days.

(21) Appl. No.: 13/476,325

(22) Filed: May 21, 2012

(65) Prior Publication Data

US 2012/0297877 A1 Nov. 29, 2012

(30) Foreign Application Priority Data

May 24, 2011 (JP) ................................. 2011-115477

(51) Int. Cl.
*G01P 15/10* (2006.01)
*G01P 15/09* (2006.01)
*G01P 15/097* (2006.01)

(52) U.S. Cl.
CPC .................................. *G01P 15/097* (2013.01)
USPC ..................................... 73/514.29; 73/514.34

(58) Field of Classification Search
CPC ... G01P 15/097; G01P 15/0802; G01P 15/18; G01P 15/10; G01P 15/08
USPC ............. 73/514.29, 514.16, 514.38, 514.01, 73/514.34
See application file for complete search history.

(56) References Cited

U.S. PATENT DOCUMENTS

| | | | | | |
|---|---|---|---|---|---|
| 4,479,385 A | * | 10/1984 | Koehler | .................. | 73/514.29 |
| 4,628,735 A | * | 12/1986 | Kirkpatrick | .................. | 73/514.29 |
| 4,856,350 A | * | 8/1989 | Hanson | .................. | 73/862.59 |
| 4,881,408 A | * | 11/1989 | Hulsing et al. | .................. | 73/514.12 |
| 4,939,935 A | * | 7/1990 | Amand | .................. | 73/514.29 |
| 4,970,903 A | * | 11/1990 | Hanson | .................. | 73/862.59 |
| 5,036,715 A | * | 8/1991 | Hanson | .................. | 73/862.59 |
| 5,379,639 A | * | 1/1995 | Hulsing et al. | .................. | 73/514.29 |
| 5,644,083 A | * | 7/1997 | Newell et al. | .................. | 73/514.29 |
| 5,755,978 A | * | 5/1998 | Newell et al. | .................. | 216/33 |
| 5,955,978 A | | 9/1999 | Fiedler et al. | | |
| 6,389,898 B1 | * | 5/2002 | Seidel et al. | .................. | 73/514.29 |
| 7,802,475 B2 | * | 9/2010 | Nishizawa et al. | .................. | 73/514.29 |
| 8,297,121 B2 | * | 10/2012 | Quer et al. | .................. | 73/514.29 |
| 2002/0047700 A1 | * | 4/2002 | Tabota | .................. | 324/76.49 |
| 2002/0170355 A1 | * | 11/2002 | Malametz | .................. | 73/514.29 |
| 2006/0096378 A1 | * | 5/2006 | Quer et al. | .................. | 73/514.29 |
| 2008/0197752 A1 | * | 8/2008 | Watanabe | .................. | 310/321 |
| 2008/0229566 A1 | | 9/2008 | Saito | | |
| 2011/0100125 A1 | * | 5/2011 | Sato | .................. | 73/514.29 |
| 2011/0174075 A1 | * | 7/2011 | Watanabe et al. | .................. | 73/514.34 |
| 2012/0297877 A1 | * | 11/2012 | Watanabe et al. | .................. | 73/514.29 |

FOREIGN PATENT DOCUMENTS

JP 2851566 11/1998
JP 2851566 B2 1/1999

* cited by examiner

*Primary Examiner* — Helen Kwok
(74) *Attorney, Agent, or Firm* — Harness, Dickey & Pierce, P.L.C.

(57) ABSTRACT

An acceleration sensor includes an acceleration detector, a first fixed portion and a second fixed portion, and first to fourth beams that connect the first fixed portion and the second fixed portion to the acceleration detector. A support substrate includes a fixed first substrate piece, a movable second substrate piece, and a hinge that connects the first substrate piece and the second substrate piece to each other. The longitudinal direction of the acceleration detector extends along the direction perpendicular to a detection axis thereof, and a central portion of the acceleration detector in the short-side direction overlaps with the hinge in the short-side direction. The length of the second substrate piece along the longitudinal direction of the hinge is greater than the length of the second substrate piece along the short-side direction of the hinge.

11 Claims, 8 Drawing Sheets

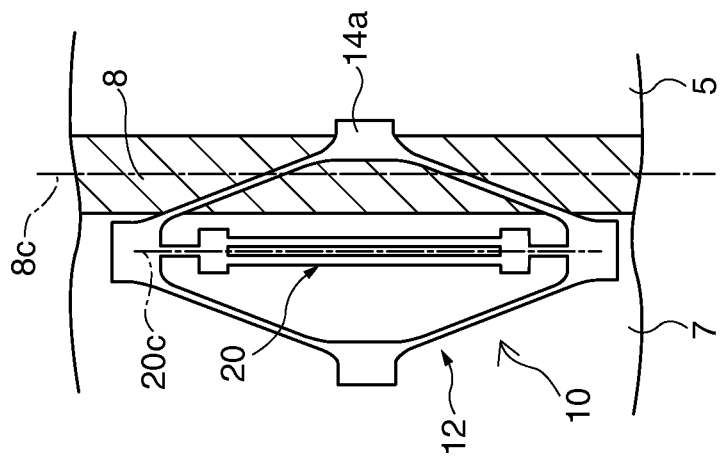
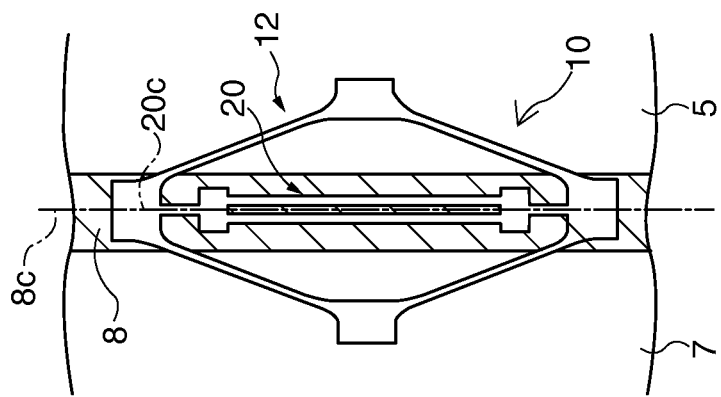
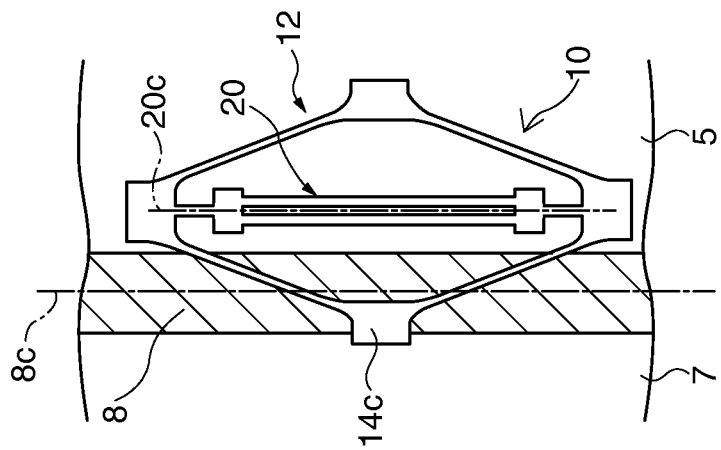

ACCELERATION SENSOR

BACKGROUND

1. Technical Field

The present invention relates to an acceleration sensor and an acceleration detection apparatus, and particularly to an acceleration sensor that not only converts the direction of a force produced when acceleration is applied into another direction but also increases the magnitude of the force, and an acceleration detection apparatus.

2. Related Art

An acceleration sensor using a piezoelectric resonator detects acceleration applied to the acceleration sensor based on a change in resonance frequency of the piezoelectric resonator that occurs when a force acts thereon in the direction of a detection axis thereof.

Japanese Patent No. 2,851,566 discloses an accelerometer having a double-ended tuning fork piezoelectric resonator attached to opposing corners of a parallelogram frame and configured to receive a compressive or tensile force acting on the other opposing corners and a method for manufacturing the accelerometer.

The accelerometer of the related art (Japanese Patent No. 2,851,566) will be described with reference to the drawings. FIG. 6 is a diagrammatic cross-sectional view showing a schematic configuration of the accelerometer of the related art. FIGS. 7A and 7B are diagrammatic views showing the configuration of a central device of the accelerometer of the related art. FIG. 7A is a plan view, and FIG. 7B is a cross-sectional view. FIG. 8 is a diagrammatic plan view showing the configuration of a transducer device of the accelerometer of the related art.

The accelerometer has a mass portion 116 connected to a support 117 by a flexure 118 for movement along a sensitive axis (detection axis) 119, as shown in FIG. 6. A pair of force sensing crystals 121 and 122 connected between the mass portion 116 and the support 117 vibrate at frequencies (resonance frequencies) corresponding to forces applied thereto. Frequency oscillators 123 and 124 excite the force sensing crystals 121 and 122, and signals from the frequency oscillators 123 and 124 are inputted to a summation circuit 126, which provides an output signal corresponding to the difference in frequency between the two signals.

The accelerometer is formed of five disc-shaped elements made, for example, of quartz crystal (crystalline quartz) and stacked together along the sensitive axis 119. That is, the accelerometer includes a central device 127 shown in FIGS. 7A and 7B, a pair of transducer devices 128 shown in FIG. 8 on opposite sides of the central device 127, and a pair of lids (not shown) on the outer sides of the transducer devices 128.

The central device 127 includes a fixed portion 134 and a movable portion (seismic mass) 133 having a mass, as shown in FIGS. 7A and 7B. The movable portion 133 is hingedly attached to the fixed portion 134 by a pair of flexures 136 for movement about a hinge axis 137 that extends in the direction perpendicular to the sensitive axis 119 (see FIG. 6). The movable portion 133 and the fixed portion 134 are disposed within a mounting ring 139 to which the fixed portion 134 is attached. An isolating ring 141 is disposed outside and concentrically about the mounting ring 139 with flexible arms 142 connecting the mounting ring 139 to the isolating ring 141. The central device 127 is formed as a unitary structure formed of the components described above.

Each of the transducer devices 128 includes a mounting ring 146 within which a force sensing device (force sensing crystal) 147 and a coupling plate 148 are disposed, as shown in FIG. 8. The force sensing device 147 has a double-ended tuning fork piezoelectric resonator 151 connected to opposing corners of a parallelogram frame 149 formed of four links 152 with pads 154 and 156 disposed on the other opposing corners. One of the pads, the pad 154, is formed integrally with the coupling plate 148, and the other one of the pads, the pad 156, is formed integrally with the mounting ring 146.

The coupling plates 148 of the two transducer devices 128 are connected to major surfaces 138 of the movable portion 133 of the central device 127 shown in FIGS. 7A and 7B with an adhesive, and the mounting rings 146 of the transducer devices 128 are connected to the mounting ring 139 of the central device 127 with an adhesive.

Each of the two lids (not shown) has a circular shape having a recess formed on one side thereof and not only forms a sealed structure but also functions as a damping plate with a gas filled therein. The recesses face the transducer devices 128, and the outer margins of the lids are connected to the mounting rings 146 of the transducer devices 128 with an adhesive.

The accelerometer disclosed in Japanese Patent No. 2,851,566, however, has a problem of a very large number of parts, including the central device 127, the two transducer devices 128, and the two lids. Other problems include a complicated structures of the central device 127 and the transducer devices 128, resulting in an expected low yield of each of the devices, a possible large number of steps of tuning the assembled accelerometer, and a very expensive cost of the accelerometer.

Further, the damping gas sealed in the accelerometer described above degrades the Q factor of the double-ended tuning fork piezoelectric resonator 151 of each of the transducer devices 128, resulting in problems of difficulty in exciting the resonator and decrease in acceleration detection sensitivity.

Moreover, in the accelerometer described above, the movable portion 133, although depending on the shape thereof, disadvantageously resonates with an external vibration source at the time of acceleration detection, resulting in a detection error and degradation in acceleration detection precision and other acceleration detection characteristics.

SUMMARY

An advantage of some aspects of the invention is to provide an acceleration sensor (accelerometer) having a simple structure, having high acceleration detection sensitivity and acceleration detection precision, and manufacturable at a low cost. Another advantage of some aspects of the invention is to provide an acceleration detection apparatus.

Application Example 1

This application example of the invention is directed to an acceleration sensor including a support substrate including a fixed first substrate piece having a first support surface, a movable second substrate piece disposed next to the first substrate piece, having a second support surface, and having a width along the direction in which the first and second substrate pieces are disposed side by side being smaller than a width along the direction perpendicular to the side-by-side direction, and a hinge disposed between the first substrate piece and the second substrate piece and connected to the first and second substrate pieces, and an acceleration detection device extending along the direction perpendicular to the side-by-side direction and including an acceleration detector having a central portion that overlaps with the hinge in a plan view, a first fixed portion and a second fixed portion fixed to the first support surface and the second support surface respectively, and beams connected to the first and second fixed portions and supporting the acceleration detector.

In the acceleration sensor described above, since the length of the second substrate piece of the support substrate along the longitudinal direction of the hinge (direction perpendicular to side-by-side direction) is longer than the length of the second substrate piece along the short-side direction of the hinge (side-by-side direction), the resonance frequency of the second substrate piece is higher than that of a support substrate having a reversed dimensional configuration.

As a result, in the acceleration sensor, the second substrate piece unlikely resonates with an external vibration source at the time of acceleration detection, whereby a detection error or degradation in acceleration detection precision and other acceleration detection characteristics will not occur.

Application Example 2

In the acceleration sensor according to the application example described above, it is preferred that a mass portion is disposed on at least one of the second support surface of the second substrate piece and a surface of the second substrate piece that faces away from the second support surface.

In the thus configured acceleration sensor, since the mass portion is disposed on at least one of the second support surface of the second substrate piece and the surface of the second substrate piece that faces away from the second support surface, the mass of the second substrate piece (inertia thereof) can be increased.

As a result, the acceleration sensor has improved sensitivity at the time of acceleration detection.

Application Example 3

In the acceleration sensor according to the application example described above, it is preferred that the beams include a first beam that connects the first fixed portion to an end of the acceleration detector in the direction perpendicular to the side-by-side direction in a plan view, a second beam that connects the first fixed portion to the other end of the acceleration detector in the direction perpendicular to the side-by-side direction in the plan view, a third beam that connects the second fixed portion to the one end, and a fourth beam that connects the second fixed portion to the other end.

In the thus configured acceleration sensor, the support substrate includes the fixed, flat-plate-shaped first substrate piece, the movable, flat-plate-shaped second substrate piece, and the hinge that connects the two substrate pieces to each other. Further, in the acceleration sensor, the acceleration detection device is so configured that the first to fourth beams form, for example, the substantially parallelogram frame portion with the first and second fixed portions disposed at opposing corners of the parallelogram and the acceleration detector connected to the other opposing corners of the parallelogram.

In the acceleration sensor described above, both the support substrate and the acceleration detection device can be formed with high dimensional precision, for example, by using a flat-plate-shaped piezoelectric substrate along with photolithography and etching. The thus formed support substrate and acceleration detection device allow a compact acceleration sensor to be manufactured in volume at a low cost.

In addition, the acceleration sensor, in which the frame portion formed of the first to fourth beams converts the direction of a force produced when acceleration is applied into the direction perpendicular thereto and increases the magnitude of the force, can detect a small amount of acceleration (high sensitivity) with high detection precision.

According to the thus configured acceleration sensor, when each of the first to fourth beams has a band-like shape having the same width throughout its length (when viewed in the direction perpendicular to the first and second support surfaces), a force produced when acceleration is applied can be transmitted efficiently, whereby a small magnitude of acceleration can be detected with high sensitivity.

Application Example 4

In the acceleration sensor according to the application example described above, it is preferred that the first substrate piece and the second substrate piece are formed integrally with the hinge, and the first support surface of the first substrate piece and the second support surface of the second substrate piece are flush with each other.

In the thus configured acceleration sensor, since the first substrate piece and the second substrate piece are formed integrally with the hinge and the first support surface of the first substrate piece and the second support surface of the second substrate piece are flush with each other, the first substrate piece and the second substrate piece can be formed integrally with the hinge with precision, for example, from a piezoelectric substrate in photolithography and etching processes.

As a result, the acceleration sensor has improved detection sensitivity and detection precision.

Further, in the acceleration sensor, since the first support surface of the first substrate piece and the second support surface of the second substrate piece can be readily flush with each other by using the technologies described above, distortion produced when the acceleration detection device is bonded to the support substrate can be minimized, whereby the manufacturing yield and the acceleration detection precision can be improved.

Application Example 5

In the acceleration sensor according to the application example described above, it is preferred that a central line of the acceleration detector along the direction perpendicular to the side-by-side direction coincides with a central line of the hinge along the direction perpendicular to the side-by-side direction in a plan view.

In the thus configured acceleration sensor, since a central line that connects the center of one end in the short-side direction to the center of the other end of the acceleration detector coincides in a plan view with a central line that connects the center of one end in the short-side direction to the center of the other end of the hinge, the acceleration detection sensitivity of the acceleration detection device can be maximized (in other words, the amount of change in frequency at which the acceleration detector vibrates in a case where the same magnitude of acceleration is applied can be maximized).

The configuration described above is based on findings obtained by the present inventors in simulations using a finite element method.

Application Example 6

In the acceleration sensor according to the application example described above, it is preferred that each of the first to fourth beams has a linear shape, and the angle between the first beam and the second beam at the first fixed portion and the angle between the third beam and the fourth beam at the second fixed portion are obtuse angles.

In the thus configured acceleration sensor, since the angle between the first beam and the second beam at the first fixed portion and the angle between the third beam and the fourth beam at the second fixed portion are obtuse angles, the angle between the first beam and the third beam and the angle between the second beam and the fourth beam are acute angles, whereby the direction of a force acting on the second substrate piece can be converted into the direction perpendicular thereto and the magnitude of the force can be increased.

Application Example 7

In the acceleration sensor according to the application example described above, it is preferred that each of the first to fourth beams has an arcuate shape obtained by combining a single or multiple arcs, and the connected first and second beams and the connected third and fourth beams have semicircular or semielliptical shapes.

The thus configured acceleration sensor, in which the connected first and second beams and the connected third and fourth beams have semicircular or semielliptical shapes, can also convert the direction of a force acting on the second substrate piece into the direction perpendicular thereto and increase the magnitude of the force.

Application Example 8

In the acceleration sensor according to the application example described above, it is preferred that at least part of the first fixed portion protrudes from the intersection of the first beam and the second beam in the direction away from the acceleration detector in a plan view, and at least part of the second fixed portion protrudes from the intersection of the third beam and the fourth beam in the direction away from the acceleration detector in the plan view.

The thus configured acceleration sensor, in which part of the first fixed portion protrudes outward from the intersection of the first beam and the second beam and part of the second fixed portion protrudes outward from the intersection of the third beam and the fourth beam, allows a force acting on the second substrate piece when acceleration is applied to be uniformly transmitted to the beams.

Application Example 9

In the acceleration sensor according to the application example described above, it is preferred that the acceleration detector includes at least one resonating beam extending along the longitudinal direction of the hinge and a pair of bases connected to ends of the resonating beam.

The thus configured acceleration sensor, in which the acceleration detector includes at least one resonating beam extending along the longitudinal direction of the hinge and a pair of bases connected to the ends of the resonating beam, can, for example, be simply so configured that the resonating beam extends or contracts in response to displacement of the second substrate piece resulting from applied acceleration and the change in frequency at which the resonating beam vibrates resulting from the produced tensile or compressive force is converted back into the applied acceleration.

Application Example 10

This application example of the invention is directed to an acceleration detection apparatus including the acceleration sensor according to any of Application Examples 1 to 9, an oscillator circuit that excites the acceleration detection device in the acceleration sensor, a counter that counts an output frequency from the oscillator circuit, and an IC having a computation circuit that processes a signal from the counter.

The thus configured acceleration detection apparatus, which includes the acceleration sensor according to any of Application Examples 1 to 9, provides the advantageous effects described in any of Application Examples 1 to 9 (for example, improvement in acceleration detection sensitivity).

BRIEF DESCRIPTION OF THE DRAWINGS

The invention will be described with reference to the accompanying drawings, wherein like numbers reference like elements.

FIGS. 4A, 4B, and 4C are plan views of a key portion and show the positional relationship between a hinge of a support substrate and an acceleration detection device in the acceleration sensor.

DESCRIPTION OF EXEMPLARY EMBODIMENTS

Embodiments in which the invention is implemented will be described below with reference to the drawings.
First Embodiment An example of an acceleration sensor will first be described.

Figure 1A:
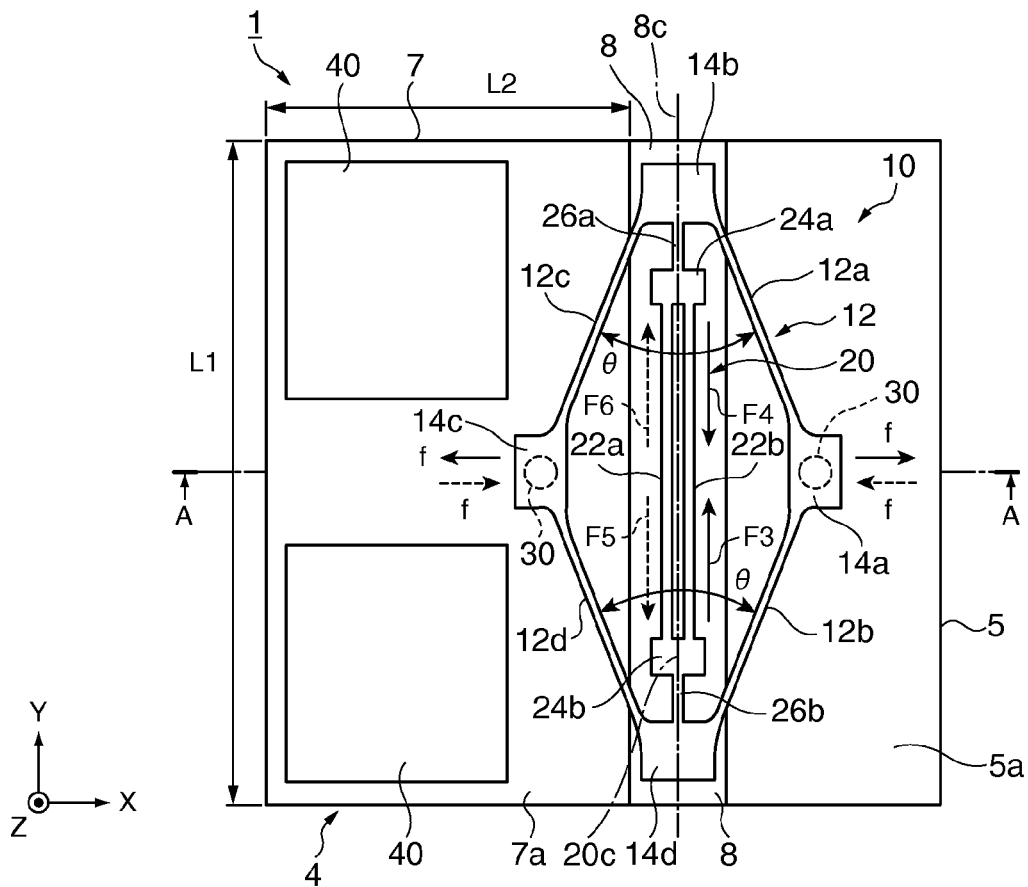
FIGS. 1A and 1B are diagrammatic views showing a schematic configuration of an acceleration sensor according to a first embodiment, FIG. 1A being a plan view and FIG. 1B being a cross-sectional view taken along the line A-A.
Figure 1B:
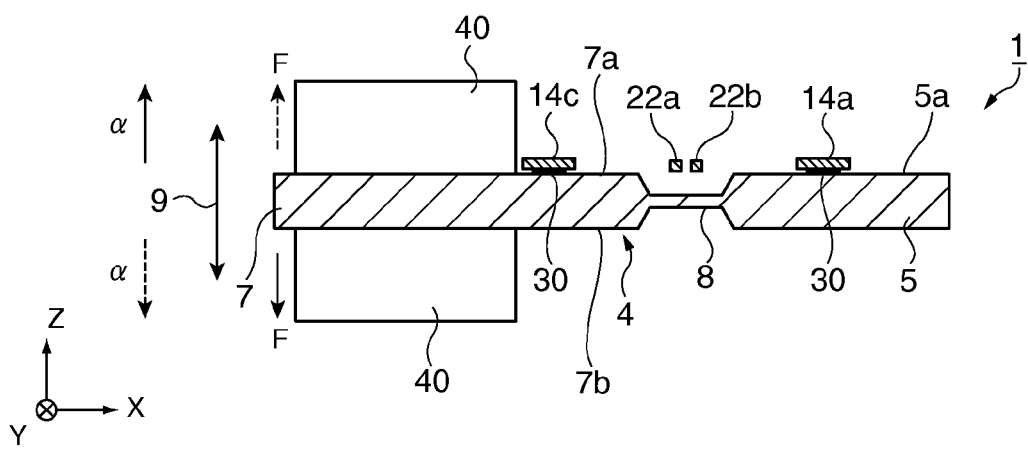

FIGS. 1A and 1B are diagrammatic views showing a schematic configuration of an acceleration sensor 1 according to a first embodiment. FIG. 1A is a plan view, and FIG. 1B is a cross-sectional view taken along the line A-A. Components in the drawings are not drawn to scale.

The acceleration sensor 1 includes an acceleration detection device 10 and a support substrate 4 having a first support surface 5a and a second support surface 7a that support the acceleration detection device 10, as shown in FIGS. 1A and 1B.

The acceleration detection device 10 includes an acceleration detector 20 that produces an electric signal according to a force in the direction of a detection axis 9 shown in FIG. 1B, a first fixed portion 14a and a second fixed portion 14c fixed to the first support surface 5a and the second support surface 7a respectively to allow the support substrate 4 to support the acceleration detector 20, and first to fourth beams 12a, 12b, 12c, 12d that connect the first fixed portion 14a and the second fixed portion 14c to the acceleration detector 20.

The support substrate 4 includes a fixed first substrate piece 5, a movable second substrate piece 7, and a hinge 8 that connects the first substrate piece 5 and the second substrate piece 7 to each other, as shown in FIG. 1B. That is, the support substrate 4 includes the fixed first substrate piece 5, which has the first support surface 5a to which the first fixed portion 14a of the acceleration detection device 10 is fixed, the movable second substrate piece 7, which is disposed next to the first substrate piece 5 and has the second support surface 7a to which the second fixed portion 14c is fixed, and the hinge 8, which connects opposing side surfaces of the first substrate piece 5 and the second substrate piece 7 to each other and allows the second substrate piece 7 to vibrate in the thickness direction (direction of detection axis 9).

The hinge 8 is formed to be thinner than the first substrate piece 5 and the second substrate piece 7 and allows the second substrate piece 7 to flex at the hinge 8. The hinge has a rectangular, trapezoidal, arcuate, or any other suitable cross-sectional shape and is located in a substantially central position in the thickness direction of the first substrate piece 5 and the second substrate piece 7.

The first substrate piece 5 and the second substrate piece 7 are formed integrally with the hinge 8, and the first support surface 5a of the first substrate piece 5 and the second support surface 7a of the second substrate piece 7 are flush with each other.

The second substrate piece 7 is so formed that a length L1 along the longitudinal direction of the hinge 8 (vertical direction in plane of view) is greater than a length L2 along the short-side direction of the hinge 8 (horizontal direction in plane of view, direction in which first substrate piece 5 and second substrate piece 7 are connected to each other).

A pair of mass portions 40, each of which has a substantially box-like shape, are disposed on at least one (both, here) of the second support surface 7a of the second substrate piece 7 and a surface 7b of the second substrate piece 7 that faces away from the second support surface 7a in positions close to the free end of the second substrate piece 7 (on the side where no hinge 8 is present).

The mass portions 40 are made of a material having relatively large specific gravity. Representative examples of the material may include Cu, Au, and other similar metals.

The mass portions 40 are fixed to the second substrate piece 7 with an adhesive (not shown). The adhesive is preferably a silicone-based adhesive, which excels in resistance to shock. It is also preferable that the adhesive is applied to only one location and the bonding area is minimized with predetermined bonding strength ensured from the viewpoint of thermal stress suppression.

The acceleration sensor 1 does not necessarily have the two separate mass portions 40 but may have a single mass portion formed of the two mass portions 40 integrated with each other. In this case, however, a plurality of bonding areas where the mass portion is bonded to the second substrate piece are preferably provided from the viewpoint of bonding strength.

It is therefore preferable to form the acceleration sensor 1 from the viewpoint of thermal stress suppression by using the two separate mass portions 40 and bonding (fixing) each of them to a single bonding area on the second substrate piece 7, as described above.

The first to fourth beams 12a to 12d of the acceleration detection device 10 form a frame-shaped parallelogram or rhombus (hereinafter referred to as frame portion 12) with the first fixed portion 14a and the second fixed portion 14c disposed at opposing corners and a first base portion 14b and a second base portion 14d disposed at the other opposing corners.

Specifically, the first beam 12a of the frame portion 12 connects the first fixed portion 14a to the first base portion 14b, and the second beam 12b connects the first fixed portion 14a to the second base portion 14d. Further, the third beam 12c connects the second fixed portion 14c to the first base portion 14b, and the fourth beam 12d connects the second fixed portion 14c to the second base portion 14d.

The first to fourth beams 12a to 12d of the acceleration detection device 10 thus form a frame-shaped parallelogram.

The first fixed portion 14a and the second fixed portion 14c of the acceleration detection device 10 are fixed to the first support surface 5a and the second support surface 7a of the support substrate 4, respectively, whereby vibration of the second substrate piece 7 is transmitted to the acceleration detector 20 via the first to fourth beams 12a to 12d.

Each of the first to fourth beams 12a to 12d has a linear shape, and the angle between the first beam 12a and the second beam 12b at the first fixed portion 14a and the angle between the third beam 12c and the fourth beam 12d at the second fixed portion 14c are obtuse angles.

That is, the frame portion 12 with the angle θ between the first beam 12a and the third beam 12c at the first base portion 14b and the angle θ between the second beam 12b and the fourth beam 12d at the second base portion 14d being acute angles converts the direction of a force acting on the first fixed portion 14a and the second fixed portion 14c into the direction perpendicular thereto, increases the magnitude of the force, and exerts the converted force to the acceleration detector 20. It is noted that how much the force is increased depends on the angle θ.

Further, each of the first to fourth beams 12a to 12d has an elongated band-like shape having the same width throughout its length in a plan view (when viewed in the direction perpendicular to the first support surface 5a and the second support surface 7a).

The acceleration detector 20 is connected to the first base portion 14b and the second base portion 14d of the frame portion 12 via a first support piece 26a and a second support piece 26b, respectively, and integrated with the frame portion 12 to form the acceleration detection device 10.

The acceleration detector 20 has an elongated configuration extending in the direction perpendicular to the detection axis 9 of the acceleration sensor 1. When the first fixed portion 14a and the second fixed portion 14c of the acceleration detection device 10 are fixed to the first support surface 5a and the second support surface 7a of the support substrate 4 with an adhesive 30, the acceleration detector 20 is so positioned along the longitudinal direction of the hinge 8 with a gap from the first support surface 5a and the second support surface 7a that a central portion of the acceleration detector 20 in the short-side direction overlaps with the hinge 8 of the support substrate 4 in the short-side direction.

In the arrangement in the present embodiment, a central line 20c that connects the center of one end in the short-side direction to the center of the other end of the acceleration detector 20 coincides in a plan view with a central line 8c that connects the center of one end in the short-side direction to the center of the other end of the hinge 8.

Further, in a plan view, at least part of the first fixed portion 14a protrudes from the frame portion 12 at the intersection of the first beam 12a and the second beam 12b, and at least part of the second fixed portion 14c protrudes from the frame portion 12 at the intersection of the third beam 12c and the fourth beam 12d.

The acceleration detector 20 is, for example, a double-ended tuning fork piezoelectric resonator including a pair of resonating arms 22a and 22b as at least one resonating beam extending along the longitudinal direction of the hinge 8 and a pair of bases 24a and 24b connected to the ends of each of the resonating arms 22a and 22b, as shown in FIG. 1A.

The acceleration detector 20 is also so configured that the base 24a, which works as one end portion in the longitudinal direction, is connected to the first beam 12a and the third beam 12c via the first support piece 26a and the first base portion 14b and the base 24b, which works as the other end portion in the longitudinal direction, is connected to the second beam 12b and the fourth beam 12d via the second support piece 26b and the second base portion 14d.

Figure 2A:
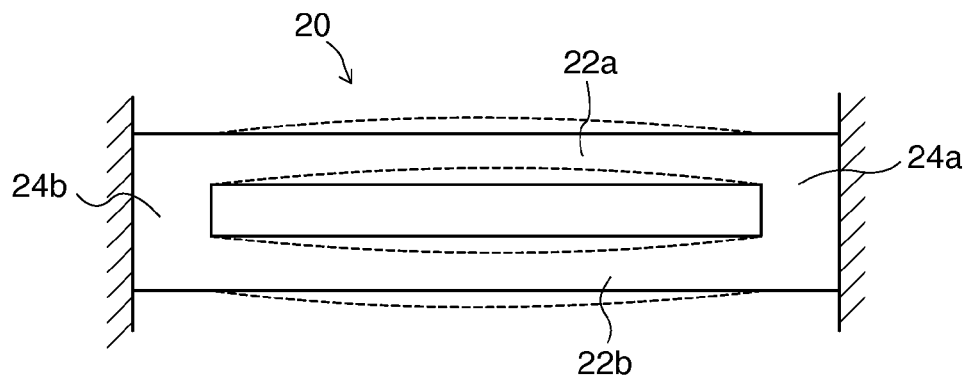
FIGS. 2A to 2C are diagrammatic views for describing a double-ended tuning fork piezoelectric resonator, FIG. 2A being a plan view showing a mode of resonation, FIG. 2B being a plan view showing excitation electrodes formed along resonating arms and the sign of charge induced at an instant, and FIG. 2C being not only a cross-sectional view taken along the short-side direction of the resonating arms but also a connection diagram of the excitation electrodes.
Figure 2B:
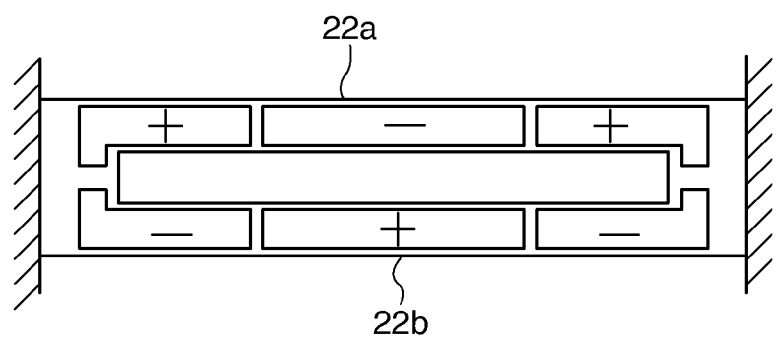
Figure 2C:
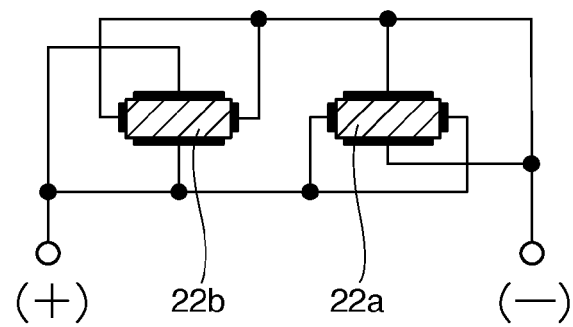

The acceleration detector 20 formed of a double-ended tuning fork piezoelectric resonator will be briefly described with reference to FIGS. 2A to 2C. FIGS. 2A to 2C are diagrammatic views for describing a double-ended tuning fork piezoelectric resonator. FIG. 2A is a plan view showing a mode of resonation. FIG. 2B is a plan view showing excitation electrodes formed along resonating arms and the sign of charge induced at an instant. FIG. 2C is not only a cross-sectional view taken along the short-side direction of the resonating arms but also a connection diagram of the excitation electrodes.

The double-ended tuning fork piezoelectric resonator 20 includes a stress sensitive portion formed of a piezoelectric substrate including a pair of bases 24a and 24b and a pair of resonating arms 22a and 22b that connect the bases 24a and 24b to each other, as shown in FIG. 2A, and excitation electrodes formed in resonating areas of the piezoelectric substrate.

The broken lines in FIG. 2A indicate a mode of resonation of the double-ended tuning fork piezoelectric resonator 20. The excitation electrodes of the double-ended tuning fork piezoelectric resonator 20 are so disposed that the pair of resonating arms 22a and 22b vibrate in a mode of resonation symmetric with respect to the central axis of the pair of resonating arms 22a and 22b along the longitudinal direction thereof.

As the double-ended tuning fork piezoelectric resonator 20, for example, a double-ended tuning fork quartz crystal resonator having a piezoelectric substrate formed of a quartz crystal substrate excels in sensitivity to tensile (stretching) and compressive stress. When a double-ended tuning fork quartz crystal resonator is used as a stress sensitive device for an altimeter or a depth meter, the excellent resolution of the resonator allows difference in altitude or depth to be derived from a slight difference in atmospheric pressure.

The frequency-temperature characteristic of a double-ended tuning fork quartz crystal resonator is expressed by an upwardly convex quadratic curve, and the turnover temperature of the double-ended tuning fork quartz crystal resonator depends on the angle of rotation around an X axis (electrical axis) of the crystalline quartz crystal of which the resonator is made. In general, each parameter is so set that the turnover temperature agrees with room temperature (25° C.)

A resonance frequency $f_F$ of a double-ended tuning fork quartz crystal resonator with an external force F acting on a pair of resonating arms thereof is expressed by Expression (1).

$$f_F = f_0(1-(KL^2F)/(2EI))^{1/2} \quad (1)$$

In Expression (1), $f_0$ represents a resonance frequency of the double-ended tuning fork quartz crystal resonator with no external force acting thereon, K represents a constant (=0.0458) in a fundamental mode, L represents the length of the resonating arms, E represents Young's modulus, and I represents the geometrical moment of inertia.

The geometrical moment of inertia I, which is expressed by $I=dw^3/12$, can be used to rewrite Expression (1) to Expression (2). In the above expression, d represents the thickness of the resonating arms, and w represents the width thereof.

$$f_F = f_0(1-S_F\sigma)^{1/2} \quad (2)$$

In Expression (2), stress sensitivity $S_F$ and stress $\sigma$ are expressed by the following expressions.

$$S_F = 12(K/E)(L/w)^2 \quad (3)$$

$$\sigma = F/(2A) \quad (4)$$

In Expression (4), A represents the cross-sectional area of the resonating arms (=w×d).

Now, a force F that compresses the double-ended tuning fork quartz crystal resonator is defined to have a negative sign, and a force F that stretches the double-ended tuning fork quartz crystal resonator is defined to have a positive sign. According to Expressions described above, the relationship between the force F and the resonance frequency $f_F$ is as follows: When the force F is compressive, the resonance frequency $f_F$ decreases, whereas when the force F is tensile (stretching), the resonance frequency $f_F$ increases. The stress sensitivity $S_F$ is proportional to the square of the length of the resonating arms over the width thereof (L/w).

The acceleration detector 20 shown in FIGS. 1A and 1B is not limited to a double-ended tuning fork quartz crystal resonator using a quartz crystal substrate described above but may be any resonator that vibrates at a frequency that changes in accordance with tensile or compressive stress inducing therein. For example, the following resonators can be used: a resonator including a driver bonded to a resonating member, a single-beam resonator, a thickness shear resonator, and an SAW resonator.

Figure 3:
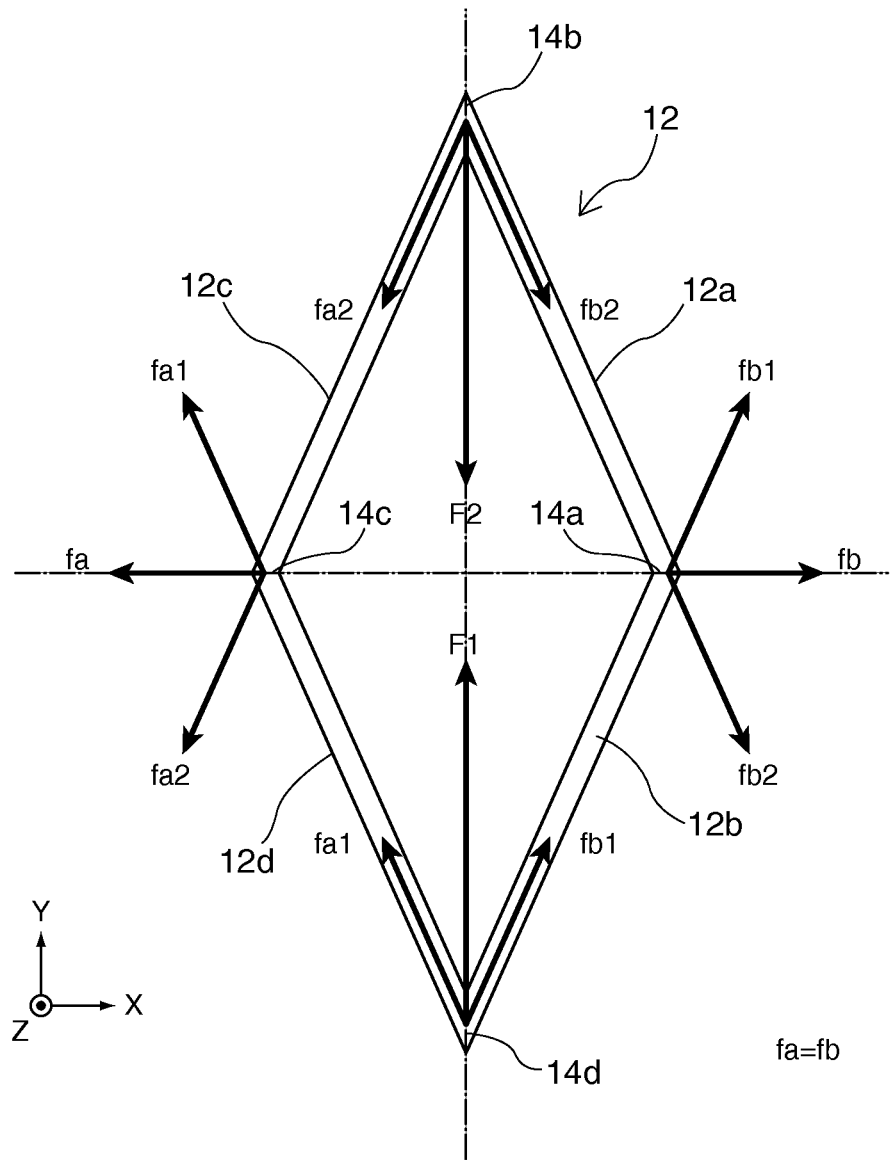
FIG. 3 is a diagrammatic view for describing an effect of a frame portion formed of first to fourth beams.

The operation of the frame portion 12 will now be described with reference to FIG. 3, which is a diagrammatic view for describing an effect of a frame portion formed of the first to fourth beams.

Assume that a force (vector) fa acts on the second fixed portion 14c in the −X-axis direction (leftward in plane of view), and a force (vector) fb acts on the first fixed portion 14a in the +X-axis direction (rightward in plane of view).

The force fa in the −X-axis direction is decomposed into a force fa2 in the direction in which the third beam 12c extends and a force fa1 in the direction in which the fourth beam 12d extends based on the parallelogram of vectors. Similarly, the force fb in the +X-axis direction is decomposed into a force fb2 in the direction in which the first beam 12a extends and a force fb1 in the direction in which the second beam 12b extends.

The forces fa1, fa2, fb1, and fb2 acting on the second fixed portion 14c and the first fixed portion 14a are equivalent to the force fa2 in the direction in which the third beam 12c extends and the force fb2 in the direction in which the first beam 12a extends acting on the first base portion 14b of the frame portion 12 and the force fa1 in the direction in which the fourth beam 12d extends and the force fb1 in the direction in which the second beam 12b extends acting on the second base portion 14d of the frame portion 12.

The forces fa2 and fb2 acting on the first base portion 14b are combined into a force F2 based on the parallelogram of vectors. Similarly, the forces fa1 and fb1 acting on the second base portion 14d are combined into a force F1.

The forces fa and fb acting on the first fixed portion 14a and the second fixed portion 14c of the frame portion 12 are equivalent to the forces F2 and F1 acting on the first base portion 14b and the second base portion 14d. That is, the frame portion 12 has a function of converting the direction of a force into the direction perpendicular thereto and a function of increasing the magnitude of the force.

The operation of the acceleration sensor 1 will now be described.

Referring back to FIGS. 1A and 1B, when acceleration α in the direction of the detection axis 9 (Z-axis direction), particularly, the +Z-axis direction, is applied to the acceleration sensor 1, a force F (=m×α, m represents the mass of the second substrate piece 7 plus the mass of the mass portions 40) acts on the second substrate piece 7 of the support substrate 4, and the force F (solid arrow F) flexes the second substrate piece 7 at the hinge 8 in the −Z-axis direction.

When the second substrate piece 7 is flexed in the −Z-axis direction, a force in the +X-axis direction acts on the first fixed portion 14a, which is fixed to the first substrate piece 5, which is fixed to an external member (not shown), and a force in the −X-axis direction acts on the second fixed portion 14c, which is fixed to the second substrate piece 7. That is, a force f in the +X-axis direction (solid arrow f) acts on the first fixed portion 14a, and a force f in the −X-axis direction (solid arrow f) acts on the second fixed portion 14c.

When the forces f having the same magnitude but oriented in opposite directions act on the first fixed portion 14a and the second fixed portion 14c of the frame portion 12 in the X-axis direction outward from the frame portion 12, forces F3 and F4 in the Y-axis direction toward the center of the frame portion 12 act on the first base portion 14b and the second base portion 14d, as described with reference to FIG. 3. The forces F3 and F4 compress the acceleration detector 20.

When the acceleration detector 20 is a double-ended tuning fork piezoelectric resonator, the frequency at which it vibrates decreases.

On the other hand, when acceleration α in the −Z-axis direction is applied to the acceleration sensor 1, a force F (broken arrow F) acts on the second substrate piece 7 of the support substrate 4, and the force F flexes the second substrate piece 7 at the hinge 8 in the +Z-axis direction.

When the second substrate piece 7 is flexed in the +Z-axis direction, a force in the −X-axis direction acts on the first fixed portion 14a, which is fixed to the first substrate piece 5, and a force in the +X-axis direction acts on the second fixed portion 14c, which is fixed to the second substrate piece 7. That is, a force f in the −X-axis direction (broken arrow f) acts on the first fixed portion 14a, and a force f in the +X-axis direction (broken arrow f) acts on the second fixed portion 14c.

When the forces f having the same magnitude but oriented in opposite directions act on the first fixed portion 14a and the second fixed portion 14c of the frame portion 12 in the X-axis direction inward in the frame portion 12, forces F5 and F6 in the Y-axis direction toward the periphery of the frame portion 12 act on the first base portion 14b and the second base portion 14d. The forces F5 and F6 stretch the acceleration detector 20.

When the acceleration detector 20 is a double-ended tuning fork piezoelectric resonator, the frequency at which it vibrates increases.

As described above, the acceleration sensor 1 can detect not only the direction of the acceleration θ based on increase or decrease in the frequency at which the acceleration detector 20 vibrates but also the magnitude of the acceleration α based on the amount of change in the frequency.

FIGS. 4A, 4B, and 4C are plan views of a key portion and show the positional relationship between the hinge of the support substrate, which is a key portion of the acceleration sensor, and the acceleration detection device fixed to the first and second substrate pieces.

In FIG. 4A, the central line 8c of the hinge 8 is shifted from the central line 20c of the acceleration detector 20 of the acceleration detection device 10 leftward in the plane of view (toward second fixed portion 14c).

In FIG. 4B, the central line 8c of the hinge 8 overlaps with (coincides with) the central line 20c of the acceleration detector 20.

In FIG. 4C, the central line 8c of the hinge 8 is shifted from the central line 20c of the acceleration detector 20 rightward in the plane of view (toward first fixed portion 14a).

In the present embodiment, the present inventors have simulated sensor sensitivity (how much frequency changes when the same force is applied, detection sensitivity) in the states shown in FIGS. 4A, 4B, and 4C by using a finite element method and found that the state shown in FIG. 4B allows uniform stress to be induced in the beams of the frame portion 12 and stress concentration to occur in a central portion of the hinge 8, whereby the sensor sensitivity is maximized.

On the other hand, the present inventors have found that the states shown in FIGS. 4A and 4C cause the stress induced in the beams of the frame portion 12 to be non-uniform and the stress induced in the hinge 8 to be distributed from the central portion to both ends, causing the sensor sensitivity to decrease.

Figure 8:
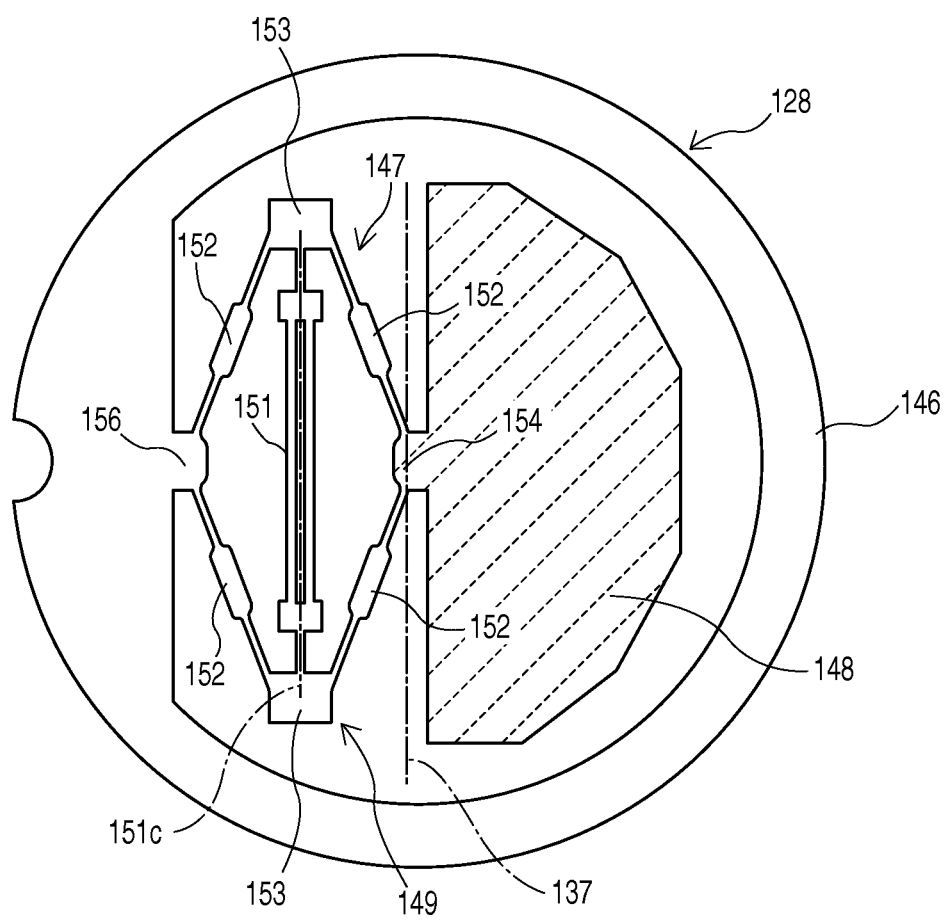
FIG. 8 is a diagrammatic plan view showing the configuration of a transducer device of the accelerometer of the related art.

In contrast, the accelerometer disclosed in Japanese Patent No. 2,851,566 greatly differs in configuration from the acceleration sensor 1 according to the present embodiment because the hinge axis (central line of hinge) 137 is set apart from a central line 151c of the double-ended tuning fork piezoelectric resonator 151, as shown in FIG. 8.

The acceleration sensor 1 is so assembled that an adhesive 30, such as low-melting glass, which causes only a small amount of residual distortion, is applied to the first fixed portion 14a and the second fixed portion 14c of the acceleration detection device 10 and the first fixed portion 14a and the second fixed portion 14c are bonded and fixed to the first support surface 5a and the second support surface 7a of the support substrate 4. The acceleration sensor 1 is typically accommodated in a sealed container, which is then evacuated before use.

An example of a method for manufacturing the support substrate 4 and the acceleration detection device 10 may include the step of processing a flat-plate-shaped piezoelectric substrate by using photolithography, etching, and evaporation. The piezoelectric substrate may be made, for example, of quartz crystal, lithium tantalate, lithium niobate, or Langasite. For example, when a quartz crystal substrate (quartz crystal wafer) is used, the acceleration detection device 10 and the support substrate 4 can be readily manufactured with high precision because the combination of quartz crystal and photolithography/etching has been a field-proven technology for years.

In the acceleration sensor 1, the support substrate 4 includes the fixed, flat-plate-shaped first substrate piece 5, the movable, flat-plate-shaped second substrate piece 7, and the hinge 8 that connects the two substrate pieces to each other, as described above. Further, in the acceleration sensor 1, the acceleration detection device 10 is so configured that the first to fourth beams 12a to 12d form the substantially parallelogram frame portion 12 with the first fixed portion 14a and the second fixed portion 14c disposed at opposing corners of the parallelogram and the acceleration detector 20 connected to the other opposing corners of the parallelogram.

In the thus configured acceleration sensor 1, both the support substrate 4 and the acceleration detection device 10 can be formed with high dimensional precision, for example, by using a flat-plate-shaped piezoelectric substrate along with photolithography and etching. The thus formed support substrate 4 and acceleration detection device 10 allow a compact acceleration sensor to be manufactured in volume at a low cost.

In addition, the acceleration sensor 1, in which the frame portion 12 formed of the first to fourth beams 12a to 12d converts the direction of a force produced when acceleration is applied into the direction perpendicular thereto and increases the magnitude of the force, can detect a small amount of acceleration (high sensitivity) with high detection precision.

Further, in the acceleration sensor 1, since the length L1 of the second substrate piece 7 of the support substrate 4 along the longitudinal direction of the hinge 8 is greater than the length L2 of the second substrate piece 7 along the short-side direction of the hinge 8, the resonance frequency of the second substrate piece 7 is higher than that of a support substrate 4 having a reversed dimensional configuration.

As a result, in the acceleration sensor 1, the second substrate piece 7 unlikely resonates with an external vibration source at the time of acceleration detection, whereby a detection error or degradation in acceleration detection precision and other acceleration detection characteristics will not occur.

Further, in the acceleration sensor 1, since the mass portions 40 are disposed on the second support surface 7a of the second substrate piece 7 and the surface 7b of the second substrate piece 7 that faces away from the second support surface 7a, the mass of the second substrate piece 7 and hence the inertia thereof can be increased.

As a result, the acceleration sensor 1 has improved sensitivity at the time of acceleration detection.

Further, in the acceleration sensor 1, since each of the first to fourth beams 12a to 12d has a band-like shape having the same width throughout its length in a plan view, a force produced when acceleration is applied can be transmitted efficiently, whereby a small magnitude of acceleration can be detected with high sensitivity.

Further, in the acceleration sensor 1, since the first substrate piece 5 and the second substrate piece 7 are formed integrally with the hinge 8 and the first support surface 5a of the first substrate piece 5 and the second support surface 7a of the second substrate piece 7 are flush with each other, the first substrate piece 5 and the second substrate piece 7 can be formed integrally with the hinge 8 with precision, for example, from a piezoelectric substrate in photolithography and etching processes.

As a result, the acceleration sensor 1 has improved detection sensitivity and detection precision.

Further, in the acceleration sensor 1, since the first support surface 5a of the first substrate piece 5 and the second support surface 7a of the second substrate piece 7 can be readily flush with each other by using the technologies described above, distortion produced when the acceleration detection device 10 is bonded to the support substrate 4 can be minimized, whereby the manufacturing yield and the acceleration detection precision can be improved.

Further, in the acceleration sensor 1, since the central line 20c of the acceleration detector 20 of the acceleration detection device 10 coincides with the central line 8c of the hinge 8 in a plan view, the acceleration detection sensitivity of the acceleration detection device 10 is maximized (in other words, the amount of change in frequency at which the acceleration detector 20 vibrates in a case where the same magnitude of acceleration is applied can be maximized).

The configuration described above is based on the findings obtained by the present inventors in the simulations using a finite element method.

Further, in the acceleration sensor 1, since each of the first to fourth beams 12a to 12d has a linear shape, and the angle between the first beam 12a and the second beam 12b at the first fixed portion 14a and the angle between the third beam 12c and the fourth beam 12d at the second fixed portion 14c are obtuse angles, the angle θ between the first beam 12a and the third beam 12c and the angle θ between the second beam 12b and the fourth beam 12d are acute angles, whereby the direction of a force acting on the second substrate piece 7 can be converted into the direction perpendicular thereto and the magnitude of the force can be increased.

The present embodiment has been described with reference to the case where the shape of the frame portion 12 formed of the first to fourth beams 12a to 12d is a parallelogram, but the shape of the frame portion 12 is not limited thereto.

For example, each of the first to fourth beams 12a to 12d may have an arcuate shape obtained by combining a single or multiple arcs, and the connected first beam 12a and second beam 12b and the connected third beam 12c and fourth beam 12d may have semicircular or semielliptical shapes.

The thus configured acceleration sensor 1, in which the connected first beam 12a and second beam 12b and the connected third beam 12c and fourth beam 12d have semicircular or semielliptical shapes, can also convert the direction of a force acting on the second substrate piece 7 into the direction perpendicular thereto and increase the magnitude of the force.

Further, the acceleration sensor 1, in which at least part of the first fixed portion 14a protrudes outward from the intersection of the first beam 12a and the second beam 12b and at least part of the second fixed portion 14c protrudes outward from the intersection of the third beam 12c and the fourth beam 12d, allows a force acting on the second substrate piece 7 when acceleration is applied to be uniformly transmitted to the beams 12a to 12d.

Further, the acceleration sensor 1, in which the acceleration detector 20 includes a pair of resonating arms 22a and 22b as resonating beams extending along the longitudinal direction of the hinge 8 and a pair of bases 24a and 24b connected to the ends of each of the resonating arms 22a and 22b, can, for example, be simply so configured that the resonating arms 22a and 22b extend or contract in response to displacement of the second substrate piece 7 resulting from applied acceleration and the change in frequency at which the resonating arms 22a and 22b vibrate resulting from the produced tensile or compressive force is converted back into the applied acceleration.

Second Embodiment

An example of an acceleration detection apparatus according to a second embodiment will next be described.

Figure 5:
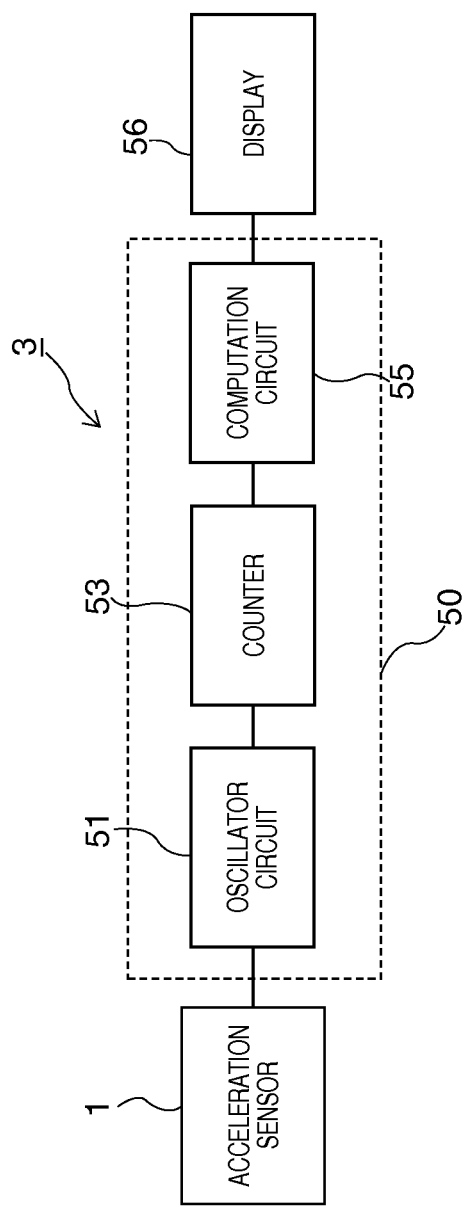
FIG. 5 is a block diagram showing the configuration of an acceleration detection apparatus according to a second embodiment.
Figure 6:
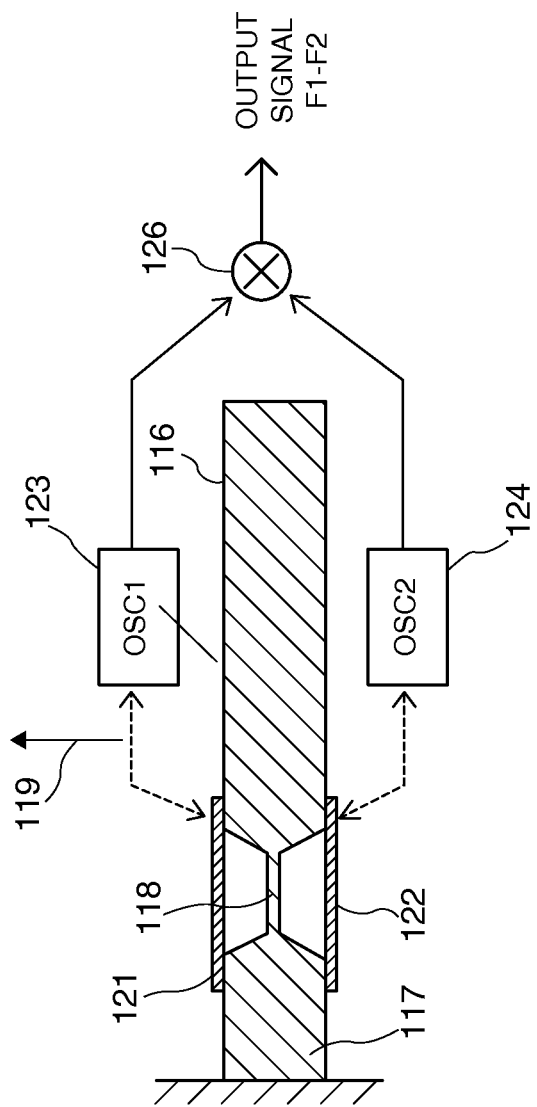
FIG. 6 is a diagrammatic cross-sectional view showing a schematic configuration of an accelerometer of related art.
Figure 7A:
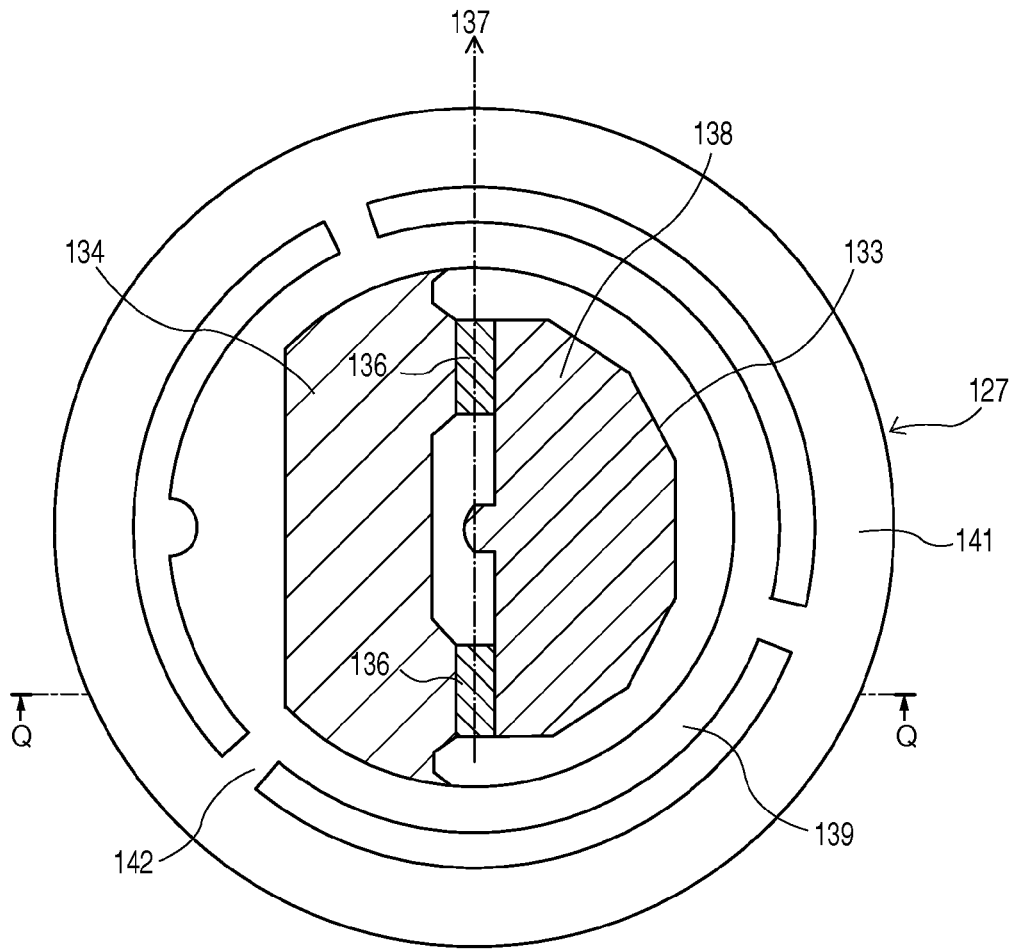
FIGS. 7A and 7B are diagrammatic views showing the configuration of a central device of the accelerometer of the related art, FIG. 7A being a plan view and FIG. 7B being a cross-sectional view taken along the line Q-Q.
Figure 7B:
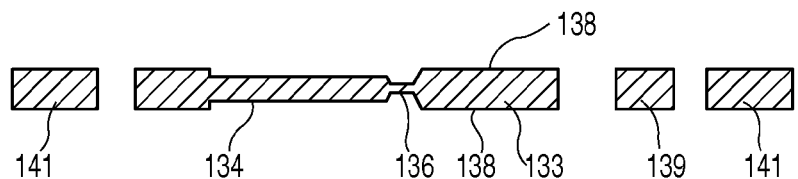

FIG. 5 is a block diagram showing the configuration of the acceleration detection apparatus according to the second embodiment.

An acceleration detection apparatus 3 includes the acceleration sensor 1 according to the first embodiment, an oscillator circuit 51 that excites the acceleration detection device 10 in the acceleration sensor 1, a counter 53 that counts the output frequency from the oscillator circuit 51, and an IC 50 having a computation circuit 55 that processes a signal from the counter 53, and a display 56, as shown in FIG. 5.

The acceleration detection apparatus 3, which includes the acceleration sensor 1 according to the first embodiment, provides the advantageous effects described in the first embodiment (for example, improvement in acceleration detection sensitivity and acceleration detection precision).

The entire disclosure of Japanese Patent Application No. 2011-115477, filed May 24, 2011 is expressly incorporated by reference herein.

What is claimed is:

1. Acceleration sensor comprising:
   a support substrate including a fixed first substrate piece having a first support surface, a movable second substrate piece disposed next to the first substrate piece, having a second support surface, and having a width along the direction in which the first and second substrate pieces are disposed side by side being smaller than a width along the direction perpendicular to the side-by-side direction, and a hinge disposed between the first substrate piece and the second substrate piece and connected to the first and second substrate pieces; and
   an acceleration detection device extending along the direction perpendicular to the side-by-side direction and including an acceleration detector having a central portion that overlaps with the hinge in a plan view, a first fixed portion and a second fixed portion fixed to the first support surface and the second support surface respectively, and beams connected to the first and second fixed portions and supporting the acceleration detector,
   wherein the central portion is separate from the hinge.

2. The acceleration sensor according to claim 1, wherein a mass portion is disposed on at least one of the second support surface of the second substrate piece and a surface of the second substrate piece that faces away from the second support surface.

3. The acceleration sensor according to claim 1, wherein the beams include a first beam that connects the first fixed portion to a first end of the acceleration detector in the direction perpendicular to the side-by-side direction in a plan view, a second beam that connects the first fixed portion to a second end of the acceleration detector in the direction perpendicular to the side-by-side direction in the plan view, a third beam that connects the second fixed portion to the first end, and a fourth beam that connects the second fixed portion to the second end.

4. The acceleration sensor according to claim 1, wherein the first substrate piece and the second substrate piece are formed integrally with the hinge, and the first support surface of the first substrate piece and the second support surface of the second substrate piece are flush with each other.

5. The acceleration sensor according to claim 1, wherein a central line of the acceleration detector along the direction perpendicular to the side-by-side direction coincides with a central line of the hinge along the direction perpendicular to the side-by-side direction in a plan view.

6. The acceleration sensor according to claim 3, wherein each of the first to fourth beams has a linear shape, and the angle between the first beam and the second beam at the first fixed portion and the angle between the third beam and the fourth beam at the second fixed portion are obtuse angles.

7. The acceleration sensor according to claim 2, wherein the beams include a first beam, a second beam, a third beam, and a fourth beam, each of the first to fourth beams has an arcuate shape obtained by combining a single or multiple arcs, and the connected first and second beams and the connected third and fourth beams have semicircular or semielliptical shapes.

8. The acceleration sensor according to claim 2, wherein the beams include a first beam, a second beam, a third beam, and a fourth beam, and at least part of the first fixed portion protrudes from the intersection of the first beam and the second beam in the direction away from the acceleration detector in a plan view, and at least part of the second fixed portion protrudes from the intersection of the third beam and the fourth beam in the direction away from the acceleration detector in the plan view.

9. The acceleration sensor according to claim 1, wherein the acceleration detector includes at least one resonating beam extending along the direction perpendicular to the side-by-side direction and a pair of bases connected to ends of the resonating beam.

10. An acceleration detection apparatus comprising:
    the acceleration sensor according to claim 1;
    an oscillator circuit that excites the acceleration detection device in the acceleration sensor;
    a counter that counts an output frequency from the oscillator circuit; and
    an IC having a computation circuit that processes a signal from the counter.

11. An acceleration detection apparatus comprising:
    the acceleration sensor according to claim 2;
    an oscillator circuit that excites the acceleration detection device in the acceleration sensor;
    a counter that counts an output frequency from the oscillator circuit; and
    an IC having a computation circuit that processes a signal from the counter.

* * * * *